United States Patent [19]

Car

[11] Patent Number: 4,462,835

[45] Date of Patent: Jul. 31, 1984

[54] LIGHTWEIGHT BUILDING MATERIAL AND METHOD OF PRODUCING THE SAME

[75] Inventor: Martin Car, Grossenhausen-Linsengericht, Fed. Rep. of Germany

[73] Assignee: Otavi Minen AG, Frankfurt, Fed. Rep. of Germany

[21] Appl. No.: 402,820

[22] Filed: Jul. 28, 1982

[30] Foreign Application Priority Data

Aug. 8, 1981 [DE] Fed. Rep. of Germany ....... 3131548

[51] Int. Cl.³ .............................................. C04B 21/00
[52] U.S. Cl. .................................. 106/75; 106/DIG. 1
[58] Field of Search ............................ 106/75, DIG. 2

[56] References Cited

U.S. PATENT DOCUMENTS

| | | | |
|---|---|---|---|
| 3,827,869 | 8/1974 | Von Bonin | 106/75 |
| 3,933,514 | 1/1976 | Banks et al. | 106/75 |
| 3,961,972 | 6/1976 | Sparlin et al. | 106/75 |
| 4,298,554 | 11/1981 | Vogel et al. | 106/DIG. 2 |

Primary Examiner—James Poer
Attorney, Agent, or Firm—Michael J. Striker

[57] ABSTRACT

A lightweight building material comprises expanded perlite as an additive and a bonding agent structure consisting of an alkalisilicate and containing pores formed by foaming and/or expansion. The pore content which results from the pore structure of the bonding agent amounts to 85 to 99% by volume, with bulk densities of 40 to 200 kg/m³, and strengths of 0.01 to 0.5 N/mm². In a method for producing a lightweight building material mortar mixes of the following composition are used:

70 to 85% by volume of perlite (bulk density from 20 to 150 g/l. grain-size from 0 to 6 mm)
23.0 to 2.5% by volume of water-glass (38 degrees Bé)
25.0 to 5.0% by volume of water
1.0 to 0.10% by volume of hardener
2.0 to 0.05% by volume of air-entrainer.

28 Claims, 1 Drawing Figure

U.S. Patent  Jul. 31, 1984  4,462,835
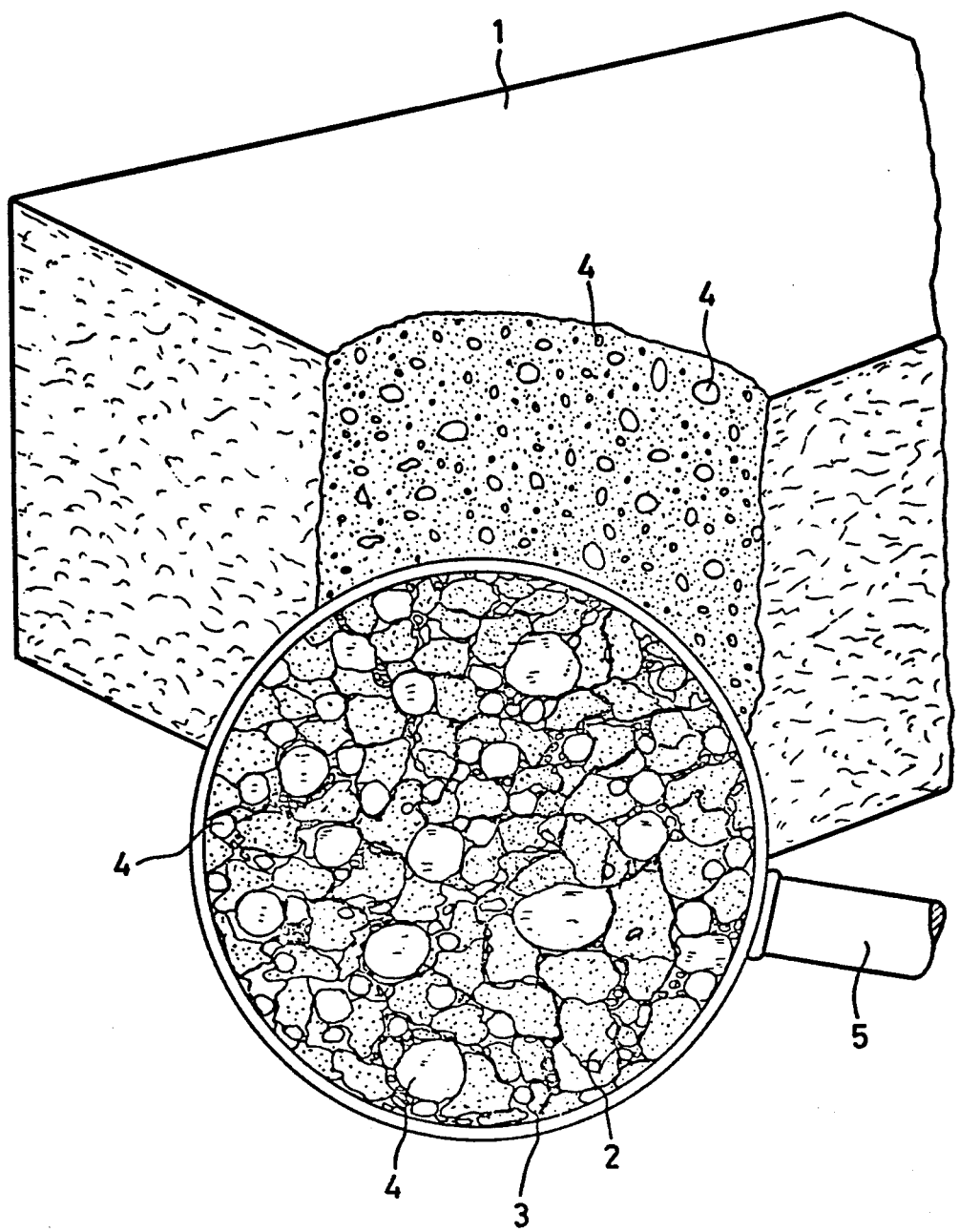

LIGHTWEIGHT BUILDING MATERIAL AND METHOD OF PRODUCING THE SAME

BACKGROUND OF THE INVENTION

The invention relates to a lightweight building material comprising expanded perlite as an additive and a bonding agent structure consisting of an alkalisilicate, preferably water-glass, e.g. sodium-, potassium-, lithium-water-glass or guanidinesilicate, a partly organic water-glass. The invention also relates to a method for producing the lightweight building material.

A lightweight building material comprising expanded perlite as an additive, and a bonding agent structure consisting of an alkalisilicate, is known from German AS No. 2,745,750. In order to prevent blooming (i.e. salt crystallization at the surface), additives such as zinc, borate, calcium, magnesium or a mixture thereof, and calcium nitrate, calcium phosphate, calcium orthophosphate, or a mixture thereof, are added to the mortar mixes for producing the building material. In addition to perlite, the known lightweight building material may also contain expanded clay, foamed glass, vermiculite or foamed diatomaceous earth.

In addition to this, German OS No. 2,813,473 discloses lightweight building materials having uniform porosity and made of a mixture of an aqueous alkalisilicate solution and aluminum and/or silicon powder as the pore forming agent, as well as active, and possible inactive, substances in the presence of an expansion regulator in the form of a methylester and or a propylenecarbonate. Cement, anhydrite or slaked lime may be used as active substances. Inactive substances may be kaolins, clays, bentonites, silicic acids, silicates, gypsum, argils, carbonates and fly ash.

German AS No. 3,001,151 discloses a method for the production of mainly light ceramic items by moulding, drying and firing a raw ceramic mass of clay, clay minerals as lightweight additives, plastic particles and/or hollow bodies, water-glass and a water-glass hardener. In this case, the lightweight additives, the water-glass, the water-glass hardener, and the raw ceramic mass are placed separately in a mould, after which the mass is dried and fired as usual, additional porosity being obtained by burning out the plastic particles. When the ceramic mass is fired, the plastic particles release gases which must be safely disposed of.

German OS No. 2,948,778, moreover, discloses a thermal-insulating material comprising a self-supporting inorganic insulating foam made of an organic basic material which is foamed under the action of heat, the foam structure consisting essentially of water-glass foamed under the action of heat. An insulating material of this kind has very little strength. For this reason, provision is made for the foam structure to be produced on a metal foil to which it adheres during the foaming action.

SUMMARY OF THE INVENTION

It is an object of this invention to provide a lightweight building material which is still lighter than known products.

The lightweight building material is realized in a structure containing foam pores and/or expansion pores in the bonding agent structure. Since a pore structure is introduced into the bonding agent structure in addition to the highly porous additive this produces a lightweight building material which has a much lower density and is, therefore, lighter than known products. This provides special advantages, more particularly increased thermal insulation and large mouldings are easier to handle.

The new lightweight building material preferably possesses a pore content arising from the pore structure of the bonding agent and of the lightweight additive of between 85 and 99% by volume, densities of between 40 and 200 kg/m$^3$ and strengths of between 0.01 and 0.5 N/mm$^2$.

There has long been a need for a new lightweight building material combining the advantages of the foamed and/or expanded structure of an inorganic or partly organic bonding agent structure. However, all attempts in this direction have failed because it has been impossible to produce a durable foamed or expanded structure when water-glass was used as the bonding agent and perlite as the additive in known products.

Surprisingly enough, foaming and/or expanding a mortar mix consisting of an alkalisilicate, preferably 38 degrees Be water-glass, as the bonding agent, expanded perlite as the additive, and a hardener known per se for the alkalisilicate, is successful if a commercially available anionic surfactant possessing interfacial activity properties, preferably a mixture of alkanesulphonate and hydroxyalkenesulphonate ("Hostapur OS" be Hoechst), or an α-olefinsulphonate according to German Pat. No. 2,056,255 is added to the mixture. Such products are generally used as foaming agents in rinses, detergents and cleaning agents and in shampoos, bubble baths, textile processing agents, leather processing agents among others.

"ARKOPON", a sodium-oleyltauride made by Hoechst is also highly suitable. This product has been used as an air-entrainer in hydraulically bonded mortars.

The lightweight building material according to the invention is preferably made from the following mortar mixes:

- 70 to 85% by volume of perlite (density 20 to 150 g/l, grain size 0 to 6 mm)
- 23.0 to 2.5% by volume of water glass (38 Bé)
- 25.0 to 5.0% by volume of water
- 1.0 to 0.10% by volume of hardener
- 2.0 to 0.05% by volume of air-entrainer or air pore former.

Surprisingly enough, the additional amount of water was found to have a favourable effect upon foaming.

$K_2SiF_6$ may be used for hardening the water-glass, as may other known inorganic, partly organic and organic hardeners. It is also possible to use $CO_2$ gas, a substance which released $CO_2$ and preferably the action of heat, if necessary, in order to promote the foaming process.

In the given mortar mixes, the air-entrainers in the bonding agent immediately produce a stable pore structure and this persists even after the building material has hardened. The effect of the air-entrainers may be increased still further by gentle stirring since this produces a higher yield of air pores. Air or another gas may also be injected.

The reaction of the air-entrainers was unexpected, because alkalisilicates normally counteract the formation of foam by these products. In producing foamed water-glass, as a lightweight building material not containing expanded additives, it was proposed in the past to use aluminum and/or silicon powder. In this respect a teaching leading in a completely different direction is imparted, namely the use of gas-developing substances.

In contrast to this, it was surprising to find that the combination of perlite and an anionic surfactant almost eliminates the foam-inhibiting effect of the alkalisilicate.

The following examples explain the production of the lightweight building material according to the preferred embodiments of the invention.

EXAMPLE 1

A mixture was produced from the following products:
  perlite (0 to 1 mm, about 50 g/l bulk density): 1.5 l
  sodium water-glass 38 degrees Bé: 0.09 kg
  water: 0.30 kg
  hardener ($K_2SiF_6$): 0.0057 kg
  air-entrainer (ARKOPON): 0.003 kg The mixture was stirred gently for about 2 to 3 minutes to produce foam. The mass was then allowed to stand so that it solidified in about 20 minutes. The yield was 1.7 l and the bulk density 70 kg/m$^3$. The solid material can be broken up and used, in granular form, as a filler.

EXAMPLE 2

The following mixture was produced and processed as in Example 1, but the mortar mass was placed in a mould in the form of a rectangular parallele piped prior to solidification:
  perlite (0 to 1 mm, about 50 g/l bulk density): 1.5 l
  sodium water-glass 38 degrees Bé: 0.281 kg
  water: 0.126 kg
  hardener ($K_2SiF_6$): 0.019 kg
  air-entrainer (ARKOPON): 0.03 kg The yield was 1.1 l, the bulk density 152 kg/m$^3$ and the strength 0.22N/mm$^2$.

EXAMPLE 3

For the purpose of increasing the yield, the following mixture was produced and processed as in Example 2:
  perlite (0 to 1 mm, about 50 g/l bulk density): 1.5 l
  sodium water-glass 38 degrees Bé: 0.255 kg
  water: 0.161 kg
  hardener ($K_2SiF_6$): 0.019 kg
  air-entrainer (ARKOPON): 0.005 kg The yield was 1.34 l, the bulk density 120 kg/m$^3$ and the strength 0.15N/mm$^2$.

EXAMPLE 4

By way of comparison, a mixture without the surfactant air-entrainer was produced from the following substances:
  perlite (0 to 1 mm, about 50 g/l bulk density): 1.5 l
  sodium water-glass 38 degrees Bé: 0.293 kg
  water: 0.283 kg
  hardener ($K_2SiF_6$): 0.025 kg The yield was 0.47 l, the bulk density 300 kg/m$^3$ and the strength 0.25N/mm$^2$.

Examples 1 to 3 indicate that some mouldings with good strength properties can be produced. However, the mass after being mixed may be filled into cavities and allowed to solidify in situ thus producing excellent thermal insulation. In addition to this, a granular material can be produced from the solidified mass according to Example 1 and this may be used as a heat-insulating filler material.

According to the invention, the additive may be replaced in part by other highly porous additives, for example vermiculite, expanded clay, foamed glass, lightweight pumice and pumicite or the like.

The amount required is governed by the effectiveness of the perlite residue which is responsible for foaming and/or expansion.

It is also possible to use other additives known per se, such as bentonite, kaolin, rice-husk ashes, fire-clay, wollastonite or other calcium silicates, kyanite or the like raw materials containing refractory clay, aluminum hydrate, clays, feldspar, feldspar substitutes, rock-granules and fine divided components thereof (basalts, pegmatites, or the like), quartz-granules and finely divided components thereof, or other silicic acid products with high specific surfaces. It is also possible to add hydraulic or latent hydraulic or synthetic substances, such as cements, hydraulic limes, metallurgical sand, trass, porous variety of volcanic tuff or the like, as well as gypsum and finely divided limestone, whereby in this case also care must be taken to ensure that sufficient perlite is available to initiate foaming and/or expansion.

In producing the mixture, it is possible to predetermine the moment at which foaming and/or expansion takes place by adding the reactant water-glass and the surfactant reactant separately to the mixture. This makes it possible to produce pre-mixes with one reactant and to add the other reactant when the foaming and/or expansion is to begin. It is also possible to produce two or more pre-mixes, with one pre-mix containing the one reactant and the other pre-mix containing the other reactant.

The structure of the lightweight building material according to a preferred embodiment of the invention is explained hereinafter in greater detail in conjunction with the drawing.

BRIEF DESCRIPTION OF THE DRAWING

The sole FIGURE illustrates the structure of the lightweight building material according to the invention.

DETAILED DESCRIPTION OF THE INVENTION

Panel 1 of the lightweight building material according to the invention has a structure consisting of densely packed perlite grains 2 connected together by bonding agent structure 3. This is mainly responsible for the strength of the lightweight building material. Also present in the structure are pores 4 produced by the expansion process, wall of the said pores being formed in the substance of the bonding agent structure. This configuration of the structure is shown clearly in the drawing by the diagrammatical image visible through the magnifying glass 5.

The lightweight building material according to the invention may be made water repellant by reactive and non-reactive hydrophobic agents (e.g. methylpolysiloxanes or the like, silicone-oils and silicone-resin emulsions, fatty amines, fatty acids, fatty alcohols and stearates).

There is no problem in obtaining surface-hydrophobic characteristics with these known agents. The use of agents for making the mass of the building material hydrophobic right to the core was not so obvious since hydrophobic agents are known to interfere with, or even inhibit, the build-up of the foam structure effected by the surfactant. However, making the core hydrophobic is accomplished according to the invention, by adding the hydrophobic agents separately at the moment when the foam structure is already completely formed and the hardening of the lightweight building material is about to begin or has already begun. Making the core hydrophobic provides the surprising advantage that blooming (.e.g salt-crystallization at the surface) can be completely inhibited.

The embodiments of the invention in which an exclusive property or privilege is claimed are defined as follows:

1. A lightweight building material, comprising an additive having from 70 to 85 volume percent of expanded perlite and having bulk density from 20 to 150 g/l and grain size from 0 to 6 mm, a bonding agent structure composed of from 2.5 to 23 volume percent of water glass, and from 0.1 to 1.0 volume percent of hardener, the bonding agent structure is porous with the pore content of between 80 and 99 percent by volume, the lightweight building material having the bulk density between 40 and 200 kg/m$^3$ and the strength between 0.01 and 0.5N/mm$^2$.

2. The building material as defined in claim 1, which is hydrophobic.

3. The building material as defined in claim 1, further including an additive selected from the group consisting of bentonite, kaolins, rice-husk ashes, fire-clay, wollastonite or other calcium silicates, kyanite or similar materials containing refractory clay, aluminum hydrate, clays, feldspar, feldspar substitutes, rock-granules, basalts, pegmatites, quarz-granules, silicic acid products with high specific surfaces, pumice and pumioite.

4. The building material as defined in claim 3, which further comprises hydraulic or latent hydraulic natural or synthetic products selected from the group consisting of cements, hydraulic limes, metallurgical sand, trass, porous volcanic tuft, gypsum and finely divided limestone.

5. A method for producing a lightweight building material, comprising the steps of mixing an additive having from 70 to 85 volume percent of expanded perlite and having bulk density 20 to 150 g/l and grain size from 0 to 6 mm, a bonding agent composed of 2.5 to 23 volume percent of water glass, 0.1 to 1.0 volume percent of hardener and 2.0 to 0.05 weight percent of air entrainer surfactant to produce a mortar mix, and allowing the mortar mix to set to form the building material.

6. The method as defined in claim 5, wherein the perlite in said additive is partially replaced by vermiculite and/or expanded clay and/or foamed glass.

7. The method as defined in claim 5, wherein an additive selected from the group consisting of bentonite, kaolin, rice-husk ashes, fire-clay, wollastonite or other calcium silicates, kyanite or similar materials containing refractory clay, aluminum hydrate, clays, feldspar, feldspar substitutes, rock-granules, basalts, pegmatites, quarz-granules and silicic acid products with high specific surfaces, pumice and pumioite is added to the mortar mix.

8. The method as defined in claim 6, wherein an additive selected from the group consisting of bentonite, kaolin, rice-husk ashes, fire-clay, wollastonite or other calcium silicates, kyanite or similar materials containing refractory clay, aluminum hydrate, clays, feldspar, feldspar substitutes, rock-granules, basalts, pegmatites, quarz-granules and silicic acid products with high specific surfaces, pumice and pumioite is added to the mortar mix.

9. The method as defined in claim 5, wherein said air-entrainer surfactant is an anionic surfactant having interfacial activity properties.

10. The method as defined in claim 9, wherein said air entrainer surfactant is a mixture of alkanesulphonate and hydroxyalkene-sulphonate.

11. The method as defined in claim 5, wherein said air-entrainer surfactant is $\alpha$-olefinsulphonate.

12. The method as defined in claim 5, wherein said air entrainer surfactant is sodium-oleytauride.

13. The method as defined in claim 5, wherein said hardener is $K_2SiF_6$.

14. The method as defined in claim 5, wherein said hardener is $CO_2$ gas or a $CO_2$-releasing substance.

15. The method as defined in claim 13, wherein heat is applied for hardening said hardener.

16. The method as defined in claim 14, wherein heat is applied for hardening said hardener.

17. The method as defined on claim 5, wherein the mortar mix is lightly stirred in order to activate said air entrainer surfactant.

18. The method as defined in claim 17, wherein the water glass and the air entrainer surfactant are added separately to the mix.

19. The method as defined in claim 18, wherein at least two preliminary separate mixes are made, one mix including the water-glass and the other mix including the air-entrainer surfactant, and the other mix being added the one mix when the foaming is to begin.

20. The method as defined in claim 19, wherein more than two separate preliminary mixes are made, one preliminary mix containing the water glass and the other preliminary mix containing the air-entrainer surfactant.

21. The method as defined in claim 19 wherein a surface of the hardened lightweight building material is made hydrophobic by a hydrophobic agent.

22. The method as defined in claim 19, wherein a hydrophobic agent is added to a foamed mass, which already exhibits a completely foamed structure and is then distributed in the mass of the material whereupon hardening occurs directly.

23. The method as defined in claim 21, wherein said hydrophobic agent is selected from the group consisting of methylpolysiloxanes, silicone-oils, silicone-resin emulsions, fatty amines, fatty acids, fatty alcohols and stearates.

24. The method as defined in claim 22, wherein said hydrophobic agent is selected from the group consisting of methylpolysiloxanes, silicon-oils, silicone-resin emulsions, fatty amines, fatty acids, fatty alcohols and stearates.

25. A lightweight building material, comprising from 70 to 85 volume percent of additive including expanded perlite and vermiculite and having bulk density from 20 to 150 g/l and grain size from 0 to 6 mm, a bonding agent structure composed of from 2.5 to 23 volume percent of water glass, and from 0.1 to 1.0 volume percent of hardener, the bonding agent structure being porous with the pore content of between 80 and 99 percent by volume, the lightweight building material having the bulk density between 40 and 200 kg/m$^3$ and the strength between 0.01 and 0.5N/mm$^2$.

26. A lightweight building material, comprising from 70 to 85 volume percent of additive including expanded perlite and expanded clay and having bulk density from 20 to 150 g/l and grain size from 0 to 6 mm, a bonding agent structure composed of from 2.5 to 23 volume percent of water glass, and from 0.1 to 1.0 volume percent of hardener, the bonding agent structure being porous with the pore content of between 80 and 99 percent by volume, the lightweight building material having the bulk density between 40 and 200 kg/m$^3$ and the strength between 0.01 and 0.5N/mm$^2$.

27. A lightweight building material, comprising from 70 to 85 volume percent of additive including expanded perlite and foamed glass and having bulk density from 20 to 150 g/l and grain size from 0 to 6 mm, a bonding agent structure composed of from 2.5 to 23 volume percent of water glass, and from 0.1 to 1.0 volume percent of hardener, the bonding agent structure being porous with the pore content of between 80 and 99 percent by volume, the lightweight building material having the bulk density between 40 and 200 kg/m$^3$ and the strength between 0.01 and 0.5 N/mm$^2$.

28. A lightweight building material, comprising from 70 to 85 volume percent of additive including expanded perlite, vermiculite, expanded clay and foamed glass and having bulk density from 20 to 150 g/l and grain size from 0 to 6 mm, a bonding agent structure composed of from 2.5 to 23 volume percent of water glass, and from 0.1 to 1.0 volume percent of hardener, the bonding agent structure being porous with the pore content of between 80 and 99 percent by volume, the lightweight building material having the bulk density between 40 and 200 kg/m$^3$ and the strength between 0.01 and 0.5 N/mm$^2$.

* * * * *